(12) United States Patent
An et al.

(10) Patent No.: US 7,871,736 B2
(45) Date of Patent: Jan. 18, 2011

(54) POLYMER MEMBRANE FOR FUEL CELL, METHOD OF PREPARING SAME, AND MEMBRANE-ELECTRODE ASSEMBLY FOR FUEL CELL COMPRISING SAME

(75) Inventors: Sung-Guk An, Suwon-si (KR); Min-Kyu Song, Suwon-si (KR); Young-Mi Park, Suwon-si (KR); You-Mee Kim, Suwon-si (KR); Sang-Il Han, Suwon-si (KR); Ho-Jin Kweon, Suwon-si (KR); Si-Hyun Lee, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1077 days.

(21) Appl. No.: 11/602,306

(22) Filed: Nov. 21, 2006

(65) Prior Publication Data

US 2007/0117000 A1 May 24, 2007

(30) Foreign Application Priority Data

Nov. 22, 2005 (KR) .................. 10-2005-0111653

(51) Int. Cl.
*H01M 8/10* (2006.01)
*C08J 5/20* (2006.01)
(52) U.S. Cl. .................. 429/492; 429/479; 429/483; 521/25
(58) Field of Classification Search .................. 429/33, 429/479, 483, 492; 521/25
See application file for complete search history.

(56) References Cited

U.S. PATENT DOCUMENTS

| 6,933,068 B2 | 8/2005 | Asano et al. |
| 2006/0106190 A1 | 5/2006 | Balland-Longeau et al. |

FOREIGN PATENT DOCUMENTS

| EP | 1 170 310 | 1/2002 |
| JP | 11-067224 | 3/1999 |
| JP | 2005-276599 | 10/2005 |
| JP | 2005310508 | 11/2005 |
| JP | 2005534787 | 11/2005 |

(Continued)

OTHER PUBLICATIONS

European Search Report corresponding to European Patent Application No. 06124571.8-2119, issued on Mar. 19, 2007.

(Continued)

*Primary Examiner*—Gregg Cantelmo
(74) *Attorney, Agent, or Firm*—Robert E. Bushnell, Esq.

(57) ABSTRACT

The polymer electrolyte membrane of the present invention includes polymers having a fluoroalkyl group and a proton conductive group. The present invention also provides a membrane-electrode assembly, a fuel cell system including the polymer electrolyte membrane, and a method of making the polymer electrolyte membrane by a chemical grafting method. The amount of the proton conductive groups in the polymer electrolyte membrane can be controlled, the membrane thickness can be easily controlled, adherence between a polymer electrolyte membrane and an electrode is improved due to the fluoroalkyl of the polymer, and long-term stability of a membrane-electrode assembly is improved.

18 Claims, 3 Drawing Sheets

FOREIGN PATENT DOCUMENTS

| | | |
|---|---|---|
| KR | 10-2003-0004097 | 1/2003 |
| KR | 10-2005-0102550 | 10/2005 |
| KR | 10-2006-0013054 | 2/2006 |
| WO | WO 96/40798 | 12/1996 |
| WO | WO 2004/014981 | 2/2004 |

OTHER PUBLICATIONS

*Alternative Polymer Systems for Proton Exchange Membranes (PEMs)* by Hickner, et al. Chemical Review; American Chemical Society, 2004.

*Amphiphilic Polymer Gem Electrolytes. 3. Influence of the Ionophobic-Ionophilic Balance on the Ion Conductive Properties* by Gavelin, et al. Electrochimica Acta, Elsevier Science, Ltd., 2001.

POLYMER MEMBRANE FOR FUEL CELL, METHOD OF PREPARING SAME, AND MEMBRANE-ELECTRODE ASSEMBLY FOR FUEL CELL COMPRISING SAME

CROSS-REFERENCE TO RELATED APPLICATION AND CLAIM OF PRIORITY

This application claims priority to and the benefit of Korean Patent Application No. 10-2005-0111653 filed in the Korean Intellectual Property Office on Nov. 22, 2005, the entire content of which is incorporated herein by reference.

FIELD OF THE INVENTION

The present invention relates to a polymer electrolyte membrane for a fuel cell, a method of preparing the same, and a fuel cell system including the same. More particularly, the present invention relates to a polymer electrolyte membrane for a fuel cell having excellent stability, and a membrane-electrode assembly for a fuel cell and a fuel cell system including the same.

BACKGROUND OF THE INVENTION

A fuel cell is a power generation system for producing electrical energy through an electrochemical redox reaction of an oxidant and pure hydrogen or hydrogen in a hydrocarbon-based material such as methanol, ethanol, and natural gas. Such a fuel cell is a clean energy source that can replace fossil fuels. It includes a stack composed of unit cells, and it produces various ranges of power. Since it has a four to ten times higher energy density than a small lithium battery, it has been highlighted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell, which uses methanol as a fuel.

The polymer electrolyte fuel cell has an advantage of a high energy density, but it has problems because hydrogen gas is difficult to handle and accessory facilities such as a fuel reforming processor for reforming methane or methanol, natural gas, and the like is required in order to produce hydrogen as the fuel gas.

On the contrary, a direct oxidation fuel cell has a lower energy density than that of the polymer electrolyte fuel cell, but it has the advantages of easy handling of a fuel, being capable of operating at room temperature due to its low operation temperature, and no need of additional fuel reforming processors.

In the above fuel cell, the stack that generates electricity includes several to scores of unit cells stacked in multiple layers, and each unit cell is formed of a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) attached to each other with an electrolyte membrane between them.

A fuel is supplied to an anode and is adsorbed on catalysts, and the fuel is oxidized to produce protons and electrons. The electrons are transferred into a cathode via an external circuit, and the protons are transferred to the cathode through a polymer electrolyte membrane. An oxidant is supplied to the cathode, and the oxidant, protons, and electrons are reacted on a catalyst at the cathode to produce electricity along with water.

The above information disclosed in this Background section is only for enhancement of understanding of the background of the invention and therefore it may contain information that does not form the prior art that is already known to a person of ordinary skill in the art.

SUMMARY OF THE INVENTION

One embodiment of the present invention provides a polymer electrolyte membrane having excellent stability.

Another embodiment of the present invention provides a method of preparing the above polymer electrolyte membrane.

Yet another embodiment of the present invention provides a membrane-electrode assembly and a fuel cell system including the polymer electrolyte membrane.

According to one embodiment of the present invention, a polymer electrolyte membrane is provided, which includes polymers having a fluoroalkyl group and a proton conductive group, represented by the following Formula 1:

(1)

wherein, in the above Formula 1, $R_1$ to $R_3$ are the same or different and are fluorine, hydrogen, or a substituted or unsubstituted alkyl group, and at least one of $R_1$ to $R_3$ is fluorine or an alkyl group substituted with fluorine;

$R_4$ to $R_6$ are independently —O—, —S—, —CO—, —SO$_2$—, or —P(Ph)O—;

$R_7$ to $R_{10}$ are independently hydrogen, a substituted or unsubstituted alkyl group, a substituted or unsubstituted heteroalkyl group, a substituted or unsubstituted aryl group, or a substituted or unsubstituted heteroaryl group;

$R_{11}$ is —O—, —S—, —CO—, or —SO$_2$—;

l and m are independently an integer ranging from 0 to 24;

w is an integer ranging from 1 to 20;

k is an integer ranging from 1 to 1000;

x is an integer ranging from 100 to 100,000;

y is an integer ranging from 1 to 10,000;

z is an integer ranging from 1 to 10,000; and

Y is a proton conductive group.

According to another embodiment of the present invention, a method of preparing a polymer electrolyte membrane is provided as follows: preparing the compound of Formula 3; performing radical polymerization of the compound of Formula 3 to obtain the polymer of Formula 1, and forming a membrane using the polymer of Formula 1.

(3)

In the above Formula 3, $R_4$ and $R_5$ are independently —O—, —S—, —CO—, —SO$_2$—, or —P(Ph)O—;

$R_7$ to $R_9$ are independently hydrogen, a substituted or unsubstituted alkyl group, a substituted or unsubstituted heteroalkyl group, a substituted or unsubstituted aryl group, or a substituted or unsubstituted heteroaryl group;

a is an integer ranging from 500 to 100,000;

b is an integer ranging from 1 to 50,000' and

X is Br, Cl, or I.

The compound of Formula 3 may be prepared by halogenating a compound of Formula 2:

(2)

The radical polymerization reaction may be performed by chemical-reacting a halogen-substituted alkoxide with the compound of Formula 3, and then adding an aryl having an ethylene group and a proton conductive group to the resultant compound to obtain a mixture, and performing the radical polymerization.

According to another embodiment of the present invention, a membrane-electrode assembly for a fuel cell is provided, which includes an anode and a cathode facing each other and a polymer electrolyte membrane interposed therebetween. The polymer electrolyte membrane includes polymers having a fluoroalkyl group and a proton conductive group, and is represented by the above Formula 1.

According to yet another embodiment of the present invention, a fuel cell system is provided, which includes an electricity generating element, a fuel supplier that supplies the electricity generating element with a fuel, and an oxidant supplier that supplies the electricity generating element with an oxidant. The electricity generating element includes a membrane-electrode assembly and separators positioned at each side of the membrane-electrode assembly. The membrane-electrode assembly includes an anode and a cathode facing each other and a polymer electrolyte membrane interposed between the anode and the cathode, the polymer electrolyte membrane including a polymer represented by Formula 1. The electricity generating element generates electricity through oxidation of a fuel and reduction of an oxidant. The fuel supplier plays a role of supplying the electricity generating element with a fuel including hydrogen, and the oxidant supplier plays a role of supplying the electricity generating element with an oxidant.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

An exemplary embodiment of the present invention will hereinafter be described in detail with reference to the accompanying drawings.

The polymer electrolyte membrane includes polymers having a fluoroalkyl group and a proton conductive group, represented by the following Formula 1:

(1)

wherein, in the above Formula 1, $R_1$ to $R_3$ are the same or different and are fluorine, hydrogen, or a substituted or unsubstituted alkyl group, and at least one of $R_1$ to $R_3$ is fluorine or an alkyl group substituted with fluorine;

$R_4$ to $R_6$ are independently —O—, —S—, —CO—, —SO$_2$—, or —P(Ph)O— where Ph is phenyl;

$R_7$ to $R_{10}$ are independently hydrogen, a substituted or unsubstituted alkyl group, a substituted or unsubstituted heteroalkyl group, a substituted or unsubstituted aryl group, or a substituted or unsubstituted heteroaryl group;

$R_{11}$ is —O—, —S—, —CO—, or —SO$_2$—;

l and m are independently an integer ranging from 0 to 24;

w is an integer ranging from 1 to 20;

k is an integer ranging from 1 to 1000;

x is an integer ranging from 100 to 100,000;

y is an integer ranging from 1 to 10,000;

z is an integer ranging from 1 to 10,000; and

Y is a proton conductive group.

The examples of the proton conductive group include sulfonic acid, carboxylic acid, phosphoric acid, and salts thereof. The salts may be selected from the group consisting of Na salts, K salts, Li salts, and Ca salts.

In the $R_7$ to $R_{10}$, the alkyl group is preferably a $C_1$ to $C_{20}$ linear or branched alkyl group, and the aryl group is preferably a $C_6$ to $C_{24}$ aryl group and is more preferably a phenyl. The heteroalkyl group may contain at least one heteroatom such as oxygen, sulfur, nitrogen or combinations thereof within the backbone residue. The substituted alkyl group or the substituted heteroalkyl group is an alkyl group or a heteroalkyl group substituted with a substituent such as fluorine, OR, SR, or $NR_2$ (wherein R is hydrogen or a $C_1$ to $C_{20}$ linear or branched alkyl group), preferably, fluorine. The heteroaryl group may be an aryl group containing a heteroatom such as oxygen, sulfur, or nitrogen in an aromatic ring. The substituted aryl group may be an aryl group wherein at least one hydrogen is substituted with a substituent, preferably at least one fluorine, OR, SR, or $NR_2$ (wherein R is hydrogen or a $C_1$ to $C_{20}$ linear or branched alkyl group).

In the above Formula 1, the polymer has a weight average molecular weight ranging from 10,000 to 1,000,000.

A polyarylene ether such as poly(2,6-dimethyl-1,4-diphenylene oxide) (PPO) has been researched as an engineering plastic due to its excellent physical properties and low hygroscopicity. Styrene sulfonic acid has also been researched due to excellent proton conductivity. Such polymers have been actively studied for use as a polymer electrolyte membrane for a fuel cell. However, in the conventional process of such polymers, a polyarylene ether membrane is subjected to radiation of electron beams such as v-rays so as to introduce a functional group that is capable of initiating radical polymerization, and then the resultant product is polymerized with a styrene sulfonic acid monomer to prepare a polyvinylidene fluoride-g-polystyrenesulfonic acid membrane. The polymer membrane prepared by the conventional method may undergo membrane cross-linking or decomposition during the electron beam radiation thereon, and therefore it is impossible to obtain a membrane having excellent properties. The polymer membrane prepared by the conventional method also has a problem of lifespan reduction of a membrane-electrode assembly due to low adherence between the polymer membrane and an electrode.

According to one embodiment of the present invention, a polymer membrane is prepared using a chemical grafting method. The polymer membrane has excellent adherence with an electrode.

The polymer of the above Formula 1 of the present invention can be prepared as follows.

The compound of the following Formula 2 is halogenated to prepare the compound of the following Formula 3. Solvents used in the halogenating reaction may be any organic solvents that are generally used. Specific examples of the organic solvent may include, but are not limited to, $CCl_4$, N-methylpyrrolidone, N,N-dimethylacetamide, N,N-dimethylformamide, and dimethylsulfoxide. The amounts of the compound of Formula 2, a halogen, and a solvent can be suitably controlled.

(2)

(3)

In the above Formulas 2 and 3, $R_4$ and $R_5$ are independently —O—, —S—, —CO—, —$SO_2$—, or —P(Ph)O—;

$R_7$ to $R_9$ are independently hydrogen, a substituted or unsubstituted alkyl group, a substituted or unsubstituted heteroalkyl group, a substituted or unsubstituted aryl group, or a substituted or unsubstituted heteroaryl group;

a is an integer ranging from 500 to 100,000;

b is an integer ranging from 1 to 50,000; and

X is Br, Cl, or I.

The mole ratio of a and b in the above Formula 3 may be in the range of 10:1 to 5:1.

Subsequently, the compound of the above Formula 3 is subjected to radical polymerization to obtain the compound of the following Formula 1. In the radical polymerization reaction, a halogen-substituted alkoxide and an aryl having an ethylene group and a proton conductive group may be used. The halogen substituted alkoxide includes sodium perfluoropropoxide, and the aryl having an ethylene group and a proton conductive group includes sodium styrene sulfonic acid, but are not limited thereto.

The radical polymerization reaction is preferably performed at a temperature of 50 to 150° C. for 4 to 48 hours.

For a reaction catalyst, a complex of copper chloride and dipyridyl may be used. The polymerization reaction is performed in an organic solvent such as N-methylpyrrolidone, N,N-dimethylacetamide, N,N-dimethylformamide, dimethylsulfoxide, and so on, but is not limited thereto.

(1)

wherein, in the above Formula 1, $R_1$ to $R_3$ are the same or different and are fluorine, hydrogen, or a substituted or unsubstituted alkyl group, and at least one of $R_1$ to $R_3$ is fluorine or an alkyl group substituted with fluorine;

$R_4$ to $R_6$ are independently —O—, —S—, —CO—, —$SO_2$—, or —P(Ph)O—;

$R_7$ to $R_{10}$ are independently hydrogen, a substituted or unsubstituted alkyl group, a substituted or unsubstituted heteroalkyl group, a substituted or unsubstituted aryl group, or a substituted or unsubstituted heteroaryl group;

$R_{11}$ is —O—, —S—, —CO—, or —$SO_2$—;

l and m are independently an integer ranging from 0 to 24;

w is an integer ranging from 1 to 20;

k is an integer ranging from 1 to 1000;

x is an integer ranging from 100 to 100,000;

y is an integer ranging from 1 to 10,000;

z is an integer ranging from 1 to 10,000; and

Y is a proton conductive group.

Preferably all of $R_1$ to $R_3$ are fluorine or alkyl groups substituted with fluorine. More preferably, all of $R_1$ to $R_3$ are fluorine. The group improves adherence with a binder of an electrode resulting in adherence improvement between a polymer electrolyte membrane and an electrode, and long-term stability improvement of a membrane-electrode assembly.

In the method of preparing the polymer electrolyte membrane according to one embodiment of the present invention, proton conductive groups are introduced by a chemical grafting method, without a polymer decomposition reaction. The method has an advantage of controlling the amount of the proton conductive groups and thereby controlling polymer properties. The polymer is thoroughly dissolved in organic solvents such that the membrane thickness can be easily controlled. The fluoroalkyl of the polymer can improve adherence with a binder of an electrode, and can resultantly improve adherence between a polymer electrolyte membrane and an electrode and also improve long-term stability of a membrane-electrode assembly.

A polymer electrolyte membrane for a fuel cell is prepared by dissolving a polymer of Formula 1 in an organic solvent, and then making a film using the solution. The organic solvent may include N-methylpyrrolidone, dimethylacetate, or dimethylfluoride. The process for making a film may include any common one that is generally well-known in the related field and not specifically illustrated herein.

According to another embodiment of the present invention, a membrane-electrode assembly including the polymer of Formula 1 as a polymer electrolyte membrane is provided. The membrane-electrode assembly includes an anode and a cathode disposed at each side of the polymer electrolyte membrane.

The anode and the cathode each include an electrode substrate formed of a conductive substrate, and a catalyst layer disposed on the electrode substrate.

Catalysts of the catalyst layer includes platinum, ruthenium, osmium, a platinum-ruthenium alloy, a platinum-osmium alloy, a platinum-palladium alloy, a platinum-M alloy, or combinations thereof, where M is a transition element selected from the group consisting of Ga, Ti, V, Cr, Mn, Fe, Co, Ni, Cu, Zn, Sn, Mo, W, Rh, and combinations thereof. Representative examples of the catalysts include Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in a form of a metal itself (black catalyst) or can be used while being supported on a support. The support may include carbon such as acetylene black, Denka Black, activated carbon, Ketjen Black, or graphite, or an inorganic particulate such as alumina, silica, zirconia, or titania. The carbon is generally used in the art.

The electrode substrates each support the cathode and the anode, and the electrode substrate of the anode provides a path for transferring a fuel to the catalyst of the anode, and the electrode substrate of the cathode provides a path for transferring an oxidant to the catalyst of the cathode. In one embodiment, the electrode substrate is formed from a material such as carbon paper, carbon cloth, carbon felt, or a metal cloth (a porous film composed of metal fiber or a metal film disposed on a surface of a cloth composed of polymer fibers). The electrode substrate is not limited thereto.

The electrode substrate may include water-repellent fluorine-based resins to prevent deterioration of diffusion efficiency caused by the water generated during operation of a fuel cell. The fluorine-based resin may include polytetrafluoro ethylene, polyvinylidene fluoride, polyhexafluoro propylene, polyperfluoroalkyl vinylether, polyperfluorosulfonylfluoride alkoxyvinyl ether, fluorinated ethylene propylene, polychlorotrifluoro ethylene, or copolymers thereof.

A microporous layer (MPL) can be further added between the electrode substrate and the catalyst layer to increase reactant diffusion effects. The microporous layer generally includes conductive powders with small particle diameters. The conductive material may include, but is not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof.

The microporous layer is formed by coating a composition comprising a conductive powder, a binder resin, and a solvent on the conductive substrate. The binder resin may include, but is not limited to, polytetrafluoro ethylene, polyvinylidene fluoride, polyhexafluoro propylene, polyperfluoroalkylvinyl ether, polyperfluoro sulfonylfluoride alkoxy vinyl ether, polyvinyl alcohol, cellulose acetate, and copolymers thereof. The solvent may include, but is not limited to, an alcohol such as ethanol, isopropylalcohol, n-propylalcohol, butanol, and so on, water, dimethyl acetamide, dimethyl sulfoxide, N-methylpyrrolidone, or tetrahydrofuran. The coating method may include, but is not limited to, screen printing, spray coating, doctor blade methods, gravure coating, dip coating, silk screening, painting, and so on, depending on the viscosity of the composition.

According to another embodiment of the present invention, a fuel cell system including the above membrane-electrode assembly is provided. A fuel cell system of the present invention includes at least one electricity generating element, a fuel supplier, and an oxidant supplier.

The electricity generating element includes a membrane-electrode assembly that includes a polymer electrolyte membrane, a cathode and an anode positioned at opposite sides of the polymer electrolyte membrane, and separators positioned at both sides of the membrane-electrode assembly. It generates electricity through oxidation of a fuel and reduction of an oxidant.

The fuel supplier plays a role of supplying the electricity generating element with a fuel such as hydrogen or hydrocarbon-based material, and the oxidant supplier plays a role of supplying the electricity generating element with an oxidant. The oxidant may be oxygen or air.

The fuel includes liquid or gaseous hydrogen, or a hydrocarbon-based fuel such as methanol, ethanol, propanol, butanol, or natural gas.

Figure 1:
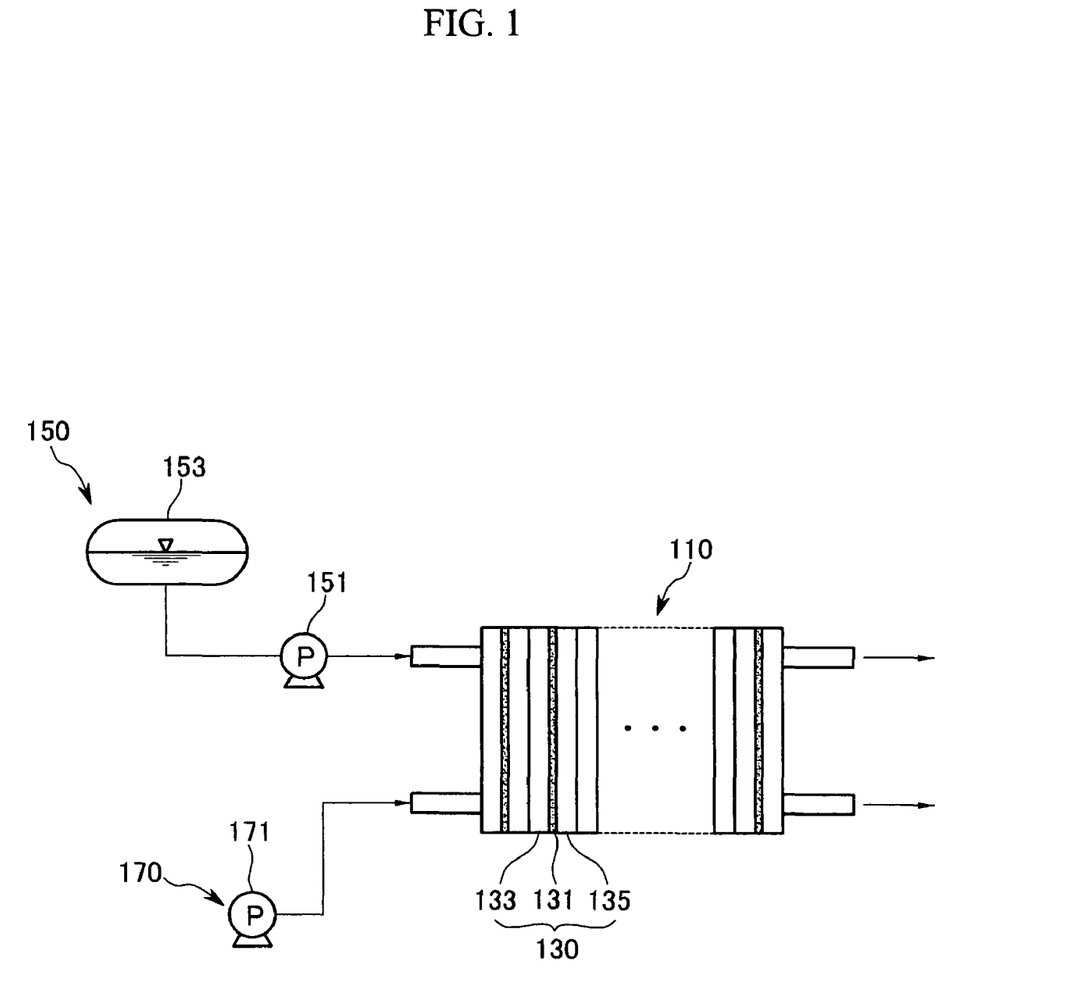
FIG. 1 is a schematic diagram showing the structure of a fuel cell system according to one embodiment of the present invention.

FIG. 1 shows a schematic structure of a fuel cell system 100 that will be described in detail with reference to this accompanying drawing, as follows. FIG. 1 illustrates a fuel cell system wherein a fuel and an oxidant are provided to the electricity generating element 130 through pumps 151 and 171, but the present invention is not limited to such structures.

For example, the fuel cell system of the present invention alternatively includes a structure wherein a fuel and an oxidant are provided in a diffusion manner.

A fuel cell system 100 includes a stack 110 composed of at least one electricity generating element 130 that generates electrical energy through an electrochemical reaction of a fuel and an oxidant, a fuel supplier 150 for supplying a fuel to the electricity generating element 130, and an oxidant supplier 170 for supplying an oxidant to the electricity generating element 130.

In addition, the fuel supplier 150 is equipped with a tank 153 that stores fuel, and the pump 151 is connected therewith. The fuel pump 151 supplies fuel stored in the tank 153 with a predetermined pumping power.

The oxidant supplier 170, which supplies the electricity generating element 130 of the stack 110 with an oxidant, is equipped with at least one pump 171 for supplying an oxidant with a predetermined pumping power.

The electricity generating element 130 includes a membrane-electrode assembly 131 that oxidizes a fuel such as hydrogen or hydrocarbon-based material and reduces an oxidant, and separators 133 and 135 that are respectively positioned at opposite sides of the membrane-electrode assembly and that supply a fuel (e.g., hydrogen or hydrocarbon-based material), and an oxidant, respectively. At least one electricity generating element 130 constitutes a stack 110.

The following examples illustrate the present invention in more detail. However, it is understood that the present invention is not limited by these examples.

EXAMPLE 1

Preparation of poly(1,4-dimethylphenylene oxide) bromide (Formula 3a)

20 g of poly(1,4-dimethylphenylene oxide) (n is 3000 in the following formula 2a) and 250 ml of $CCl_4$ were put in a 500 ml two neck round flask and then dissolved at 90° C. 2.149 of bromine was gradually added to the solution in a dropwise fashion while lighting the flask with an infrared lamp, and thereafter was refluxed for 5 hours.

When the reaction was complete, the refluxed product was cooled to room temperature and then precipitated in an excessive amount of methanol. The precipitated sediments were filtered, washed with an excessive amount of water, and dried at 80° C. in a vacuum oven, preparing a compound of the following Formula 3a. Herein, a and b in Formula 3a are present in a ratio of 5:1.

(2a)

(3a)

Preparation of the Compound of Formula 1a 10 g of a compound prepared according to Formula 3a was dissolved in 500 mL of N,N-dimethylacetamide, and thereafter 0.1 g of sodium perfluoropropoxide was added thereto. The resulting mixture was reacted at 70° C. for 12 hours and then precipitated in an excessive amount of methanol and vacuum-dried.

5 g of the completely-dried compound sample was dissolved in 500 ml of N-methylpyrrolidone, and thereafter 0.1 g of copper chloride, 0.5 g of 2,2'-dipyridyl, and 10 g of sodium styrene sulfonate were added thereto. The resulting mixture was bubbled with nitrogen gas while agitating it for 30 minutes, and thereafter radical polymerization was performed at 125° C. for 24 hours in an oil bath. When the polymerization was complete, the reaction temperature was cooled to room temperature, gaining a product. Then, the product was precipitated in an excessive amount of methanol, gaining Compound 1a represented by Formula 1a. Herein, x was 1500, y was 750, and z was 750 in Formula 1a.

(1a)

Next, the prepared polymer of Formula 1a was dissolved in N-methylpyrrolidone and then cast on a glass plate, preparing a polymer electrolyte membrane for a fuel cell.

Figure 2A:
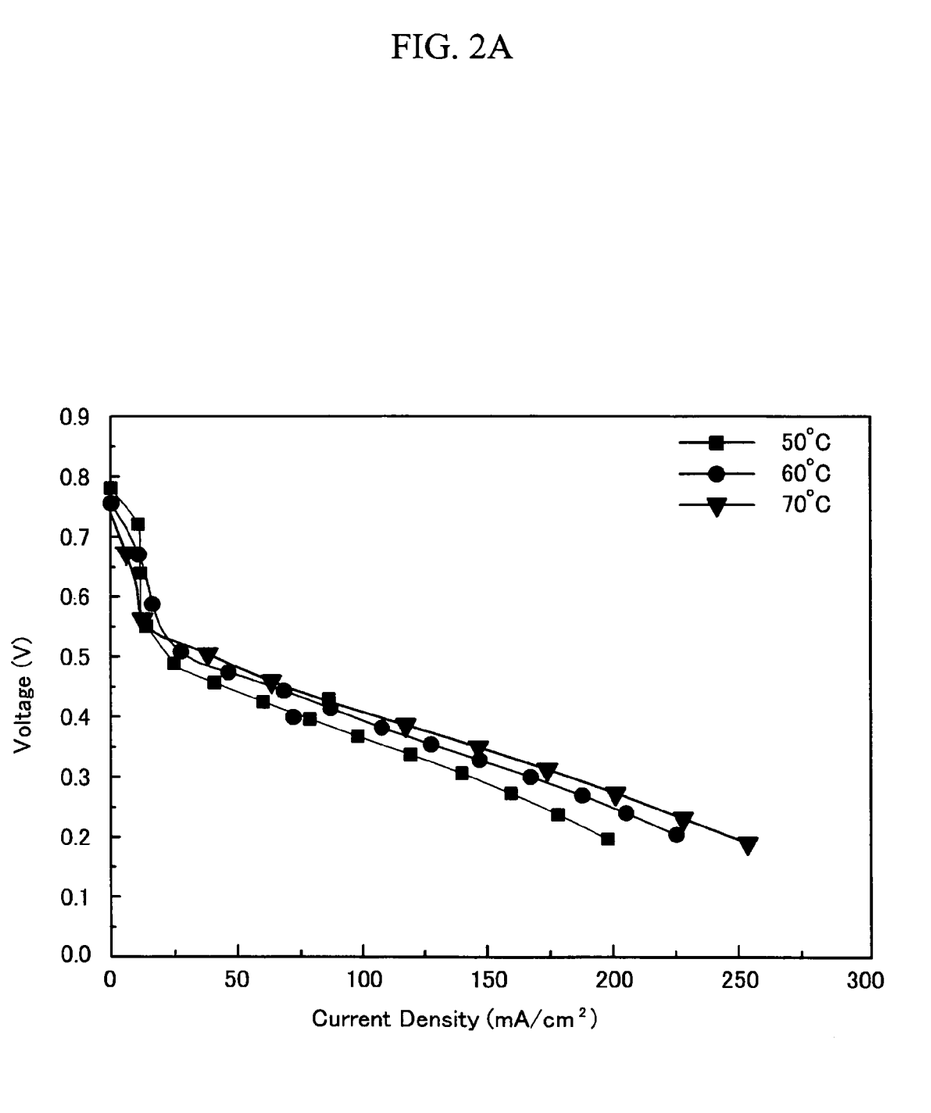
FIG. 2A shows current density and voltage characteristics of the fuel cell according to Example 1 in accordance with a variation of a temperature.
Figure 2B:
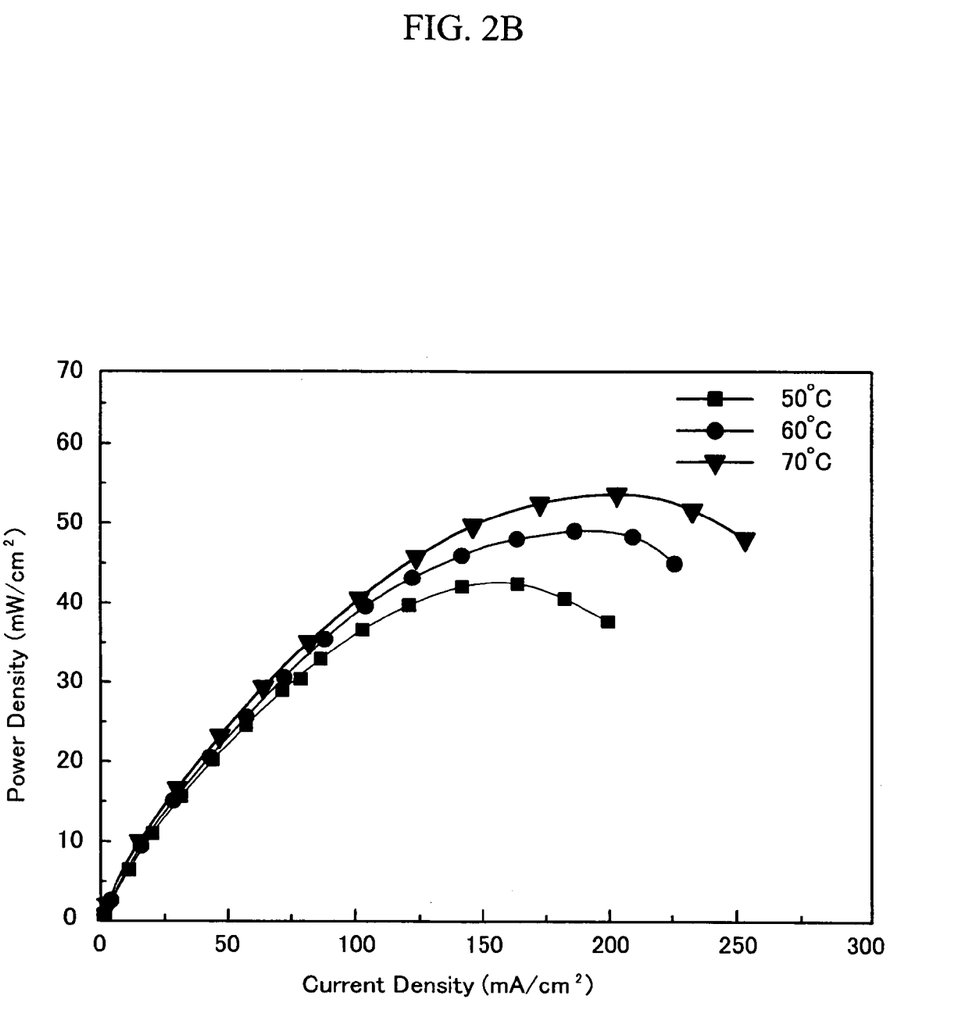
FIG. 2B shows power characteristics of the fuel cell according to Example 1 in accordance with a variation of a temperature.

The prepared polymer electrolyte membrane was used to fabricate a fuel cell in a common manufacturing method. The fuel cell was evaluated regarding its power characteristic according to different operation temperatures such as 50° C., 60° C., and 70° C. The results are provided in FIGS. 2A and 2B. As shown in FIGS. 2A and 2B, as a temperature increased, its power characteristic was improved.

The polymer electrolyte membrane has high temperature stability and thereby can provide a fuel cell showing high temperature performance.

Also, according to the embodiment of the present invention, the amount of the proton conductive groups in the polymer electrolyte membrane can be controlled, the membrane thickness can be easily controlled, adherence between a polymer electrolyte membrane and an electrode is improved due to the fluoroalkyl of the polymer, and/or long-term stability of a membrane-electrode assembly is improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polymer electrolyte membrane for a fuel cell, comprising a polymer of Formula 1:

(1)

wherein $R_1$ to $R_3$ are the same or different, and are fluorine, hydrogen, or a substituted or unsubstituted alkyl group, and at least one of $R_1$ to $R_3$ is fluorine or an alkyl group substituted with fluorine;
$R_4$ to $R_6$ are independently —O—, —S—, —CO—, —SO$_2$—, or —P(Ph)O— where Ph is phenyl-;
$R_7$ to $R_{10}$ are independently hydrogen, a substituted or unsubstituted alkyl group, a substituted or unsubstituted heteroalkyl group, a substituted or unsubstituted aryl group, or a substituted or unsubstituted heteroaryl group;
$R_{11}$ is —O—, —S—, —CO—, or —SO$_2$—;
l and m are independently an integer ranging from 0 to 24;
w is an integer ranging from 1 to 20;
k is an integer ranging from 1 to 1000;
x is an integer ranging from 100 to 100,000;
y is an integer ranging from 1 to 100,000;
z is an integer ranging from 1 to 10,000; and
Y is a proton conductive group.

2. The polymer electrolyte membrane of claim 1, wherein the Y is selected from the group consisting of sulfonic acid, carboxylic acid, phosphoric acid, and salts thereof.

3. The polymer electrolyte membrane of claim 2, wherein the salts are selected from the group consisting of Na salts, K salts, Li salts, Ca salts, and combinations thereof.

4. The polymer electrolyte membrane of claim 1, wherein $R_1$ to $R_3$ are all fluorine.

5. The polymer electrolyte membrane of claim 1, wherein the polymer has a weight average molecular weight ranging from 10,000 to 1,000,000.

6. The polymer electrolyte membrane of claim 1, wherein the polymer is represented by Formula 1a:

(1a)

7. A method of preparing a polymer electrolyte membrane comprising:
preparing a polymer of Formula 3:
performing radical polymerization of the compound of Formula 3 to obtain a polymer of Formula 1; and
forming a membrane using the polymer of Formula 1:

(1)

(3)

wherein $R_1$ to $R_3$ are the same or different and are fluorine, hydrogen, or a substituted or unsubstituted alkyl group, and at least one of $R_1$ to $R_3$ is fluorine or an alkyl group substituted with fluorine;
$R_4$ to $R_6$ are independently —O—, —S—, —CO—, —SO$_2$—, or —P(Ph)O—;
$R_7$ to $R_{10}$ are independently hydrogen, a substituted or unsubstituted alkyl group, a substituted or unsubstituted heteroalkyl group, a substituted or unsubstituted aryl group, or a substituted or unsubstituted heteroaryl group;
$R_{11}$ is —O—, —S—, —CO—, or —SO$_2$—;
l and m are independently an integer ranging from 0 to 24,
w is an integer ranging from 1 to 20,
k is an integer ranging from 1 to 1000,
x is an integer ranging from 100 to 100,000,
y is an integer ranging from 1 to 10,000,
z is an integer ranging from 1 to 10,000,
Y is a proton conductive group,
a is an integer ranging from 500 to 100,000,
b is an integer ranging from 1 to 50,000, and
X is Br, Cl, or I.

8. The method of claim 7, wherein the preparation of the compound of Formula 3 comprises halogenating a compound of Formula 2:

(2)

9. The method of claim 7, wherein the Y is selected from the group consisting of sulfonic acid, carboxylic acid, phosphoric acid, and salts thereof.

10. The method of claim 9, wherein the salts are selected from the group consisting of Na salts, K salts, Li salts, Ca salts, and combinations thereof.

11. The method of claim 7, wherein the mole ratio of a and b in the above Formula 3 is the range of 10:1 to 5:1.

12. The method of claim 7, wherein the radical polymerization reaction is performed at a temperature of 50 to 150° C. for 4 to 48 hours.

13. The method of claim 7, wherein the radical polymerization reaction comprises chemical-reacting a halogen-substituted alkoxide with the compound of Formula 3, and then adding an aryl having an ethylene group and a proton conductive group to the resultant compound to obtain a mixture, and performing the radical polymerization.

14. The method of claim 13, wherein the halogen-substituted alkoxide is perfluoropropoxide or its salt, and the aryl having the ethylene group and the proton conductive group is styrene sulfonic acid or its salt.

15. The method of claim 7, wherein the formation of the membrane comprises dissolving the polymer of Formula 1 in an organic solvent to form a solution, and then making a film using the solution.

16. The method of claim 8, wherein the compound of Formula 2 is poly(1,4-dimethylphenylene oxide) represented by Formula 2a, the compound of Formula 3 is represented by Formula 3a, and the polymer of Formula 1 is represented by Formula 1a:

(2a)

wherein n is 3,000;

(3a)

wherein a is an integer ranging from 500 to 100,000, b is an integer ranging from 1 to 50,000, and the mole ratio of a and b is 5:1;

(1a)

where x is 1,500, y is 750, and z is 750.

17. A membrane-electrode assembly for a fuel cell, comprising:
an anode and a cathode facing each other; and
a polymer electrolyte membrane interposed between the anode and the cathode, the polymer electrolyte membrane comprising a polymer represented by Formula 1:

(1)

wherein $R_1$ to $R_3$ are the same or different, and are fluorine, hydrogen, or a substituted or unsubstituted alkyl group, and at least one of $R_1$ to $R_3$ is fluorine or an alkyl group substituted with fluorine;

$R_4$ to $R_6$ are independently —O—, —S—, —CO—, —SO$_2$—, or —P(Ph)O where Ph is phenyl-;

$R_7$ to $R_{10}$ are independently hydrogen, a substituted or unsubstituted alkyl group, a substituted or unsubstituted heteroalkyl group, a substituted or unsubstituted aryl group, or a substituted or unsubstituted heteroaryl group;

$R_{11}$ is —O—, —S—, —CO—, or —SO$_2$—;

l and m are independently an integer ranging from 0 to 24;
w is an integer ranging from 1 to 20;
k is an integer ranging from 1 to 1000;
x is an integer ranging from 100 to 100,000;
y is an integer ranging from 1 to 10,000;
z is an integer ranging from 1 to 10,000; and
Y is a proton conductive group.

18. A fuel cell system comprising:
an electricity generating element generating electricity by fuel oxidation and oxidant reduction reactions, the electricity generating element comprising:
a membrane-electrode assembly comprising an anode and a cathode facing each other and a polymer electrolyte membrane interposed between the anode and the cathode, the polymer electrolyte membrane comprising a polymer represented by Formula 1:

(1)

$R_1$ to $R_3$ are the same or different, and are fluorine, hydrogen, or a substituted or unsubstituted alkyl group, and at least one of $R_1$ to $R_3$ is fluorine or an alkyl group substituted with fluorine;

$R_4$ to $R_6$ are independently —O—, —S—, —CO—, —SO$_2$—, or —P(Ph)O where Ph is phenyl-;

$R_7$ to $R_{10}$ are independently hydrogen, a substituted or unsubstituted alkyl group, a substituted or unsubstituted heteroalkyl group, a substituted or unsubstituted aryl group, or a substituted or unsubstituted heteroaryl group;

$R_{11}$ is —O—, —S—, —CO—, or —SO$_2$—;

l and m are independently an integer ranging from 0 to 24;

w is an integer ranging from 1 to 20;

k is an integer ranging from 1 to 1000;

x is an integer ranging from 100 to 100,000;

y is an integer ranging from 1 to 10,000;

z is an integer ranging from 1 to 10,000; and

Y is a proton conductive group; and separators positioned at each side of the membrane-electrode assembly;

a fuel supplier supplying the electricity generating element with a fuel; and an oxidant supplier supplying the electricity generating element with an oxidant.

\* \* \* \* \*